F. SCHORIK & F. F. MARSHALL.
AUTOMATIC LIQUID MEASURING DEVICE.
APPLICATION FILED MAR. 28, 1913.
1,102,806.
Patented July 7, 1914.
5 SHEETS—SHEET 3
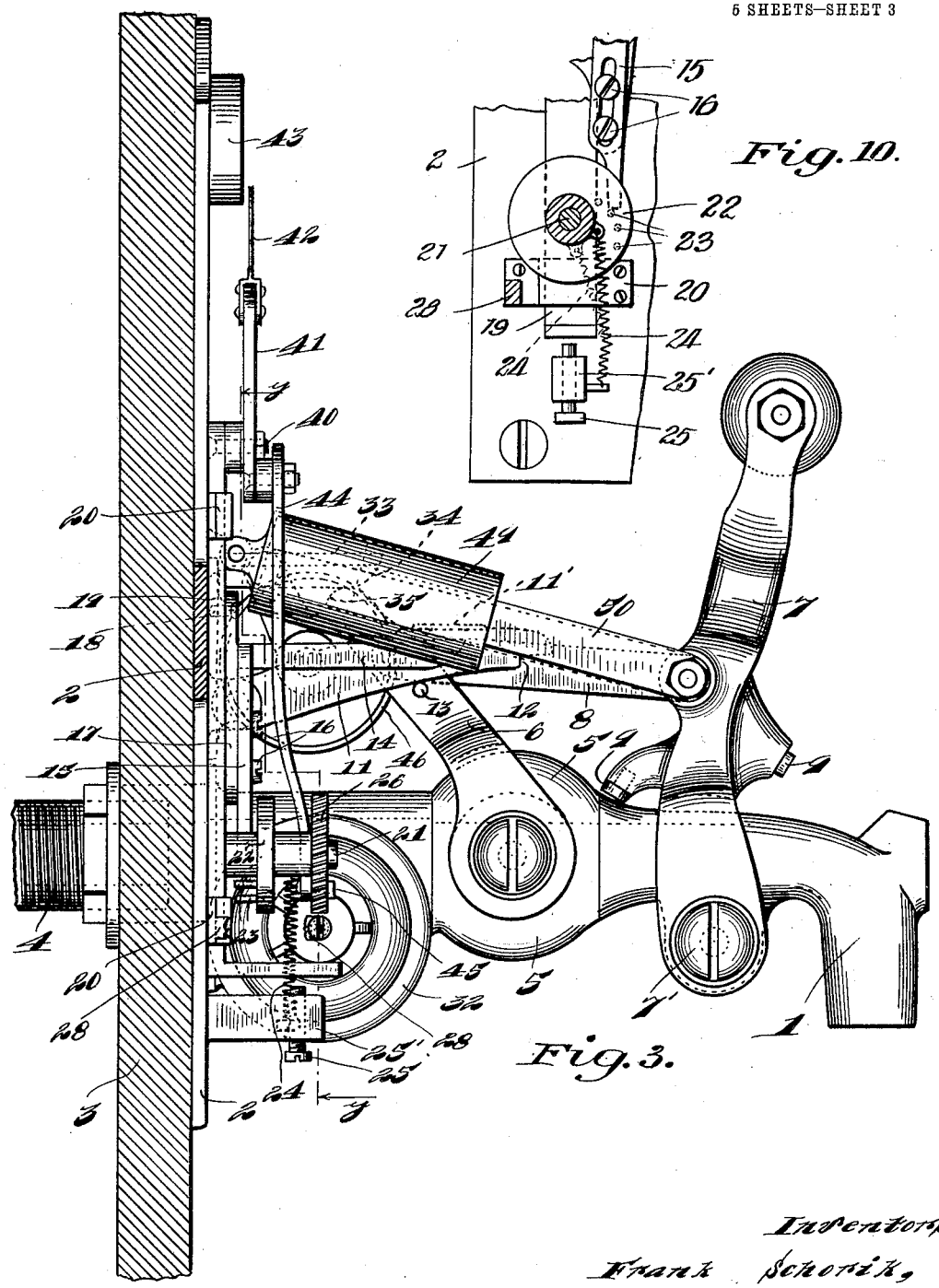
Witnesses:
C. E. Vessels.
A. A. Olson.
Inventors:
Frank Schorik,
And
Frank F. Marshall,
By Joshua R. H. Potts
Their Attorney.

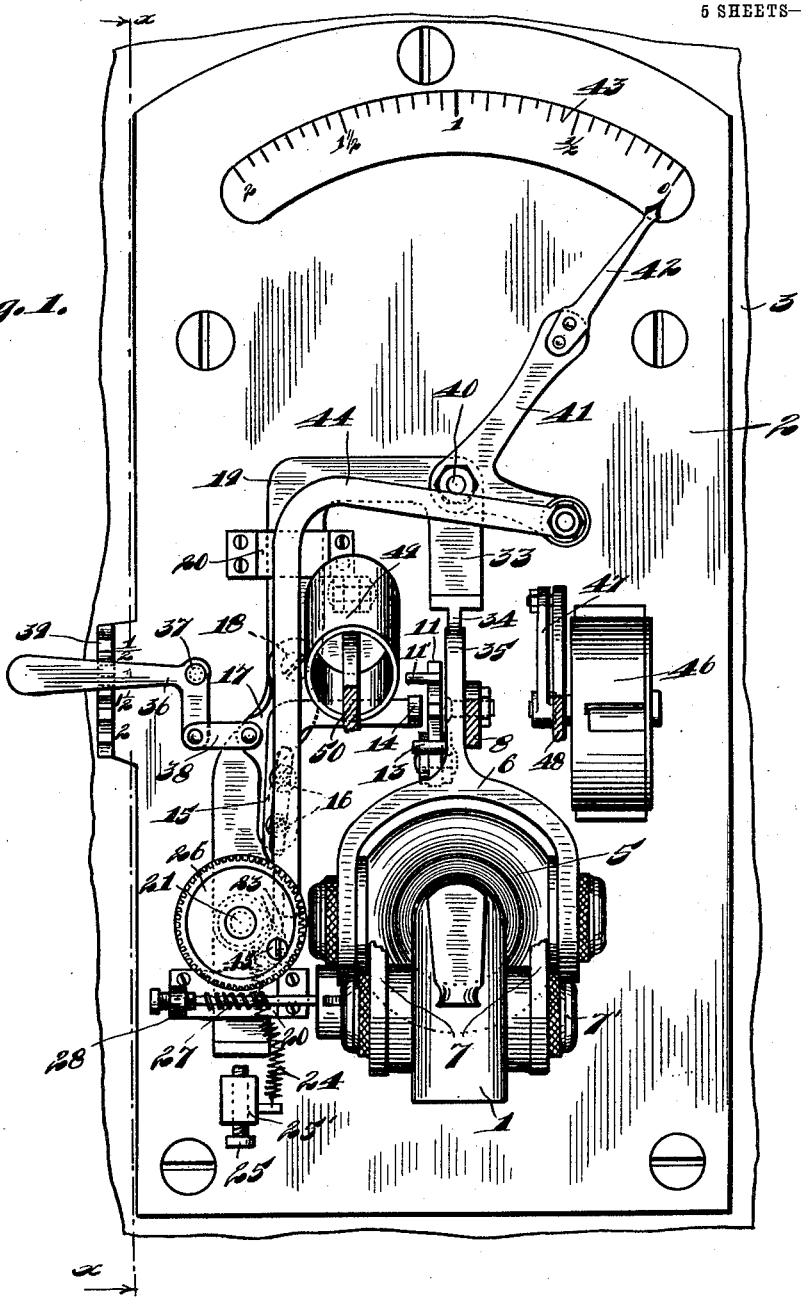

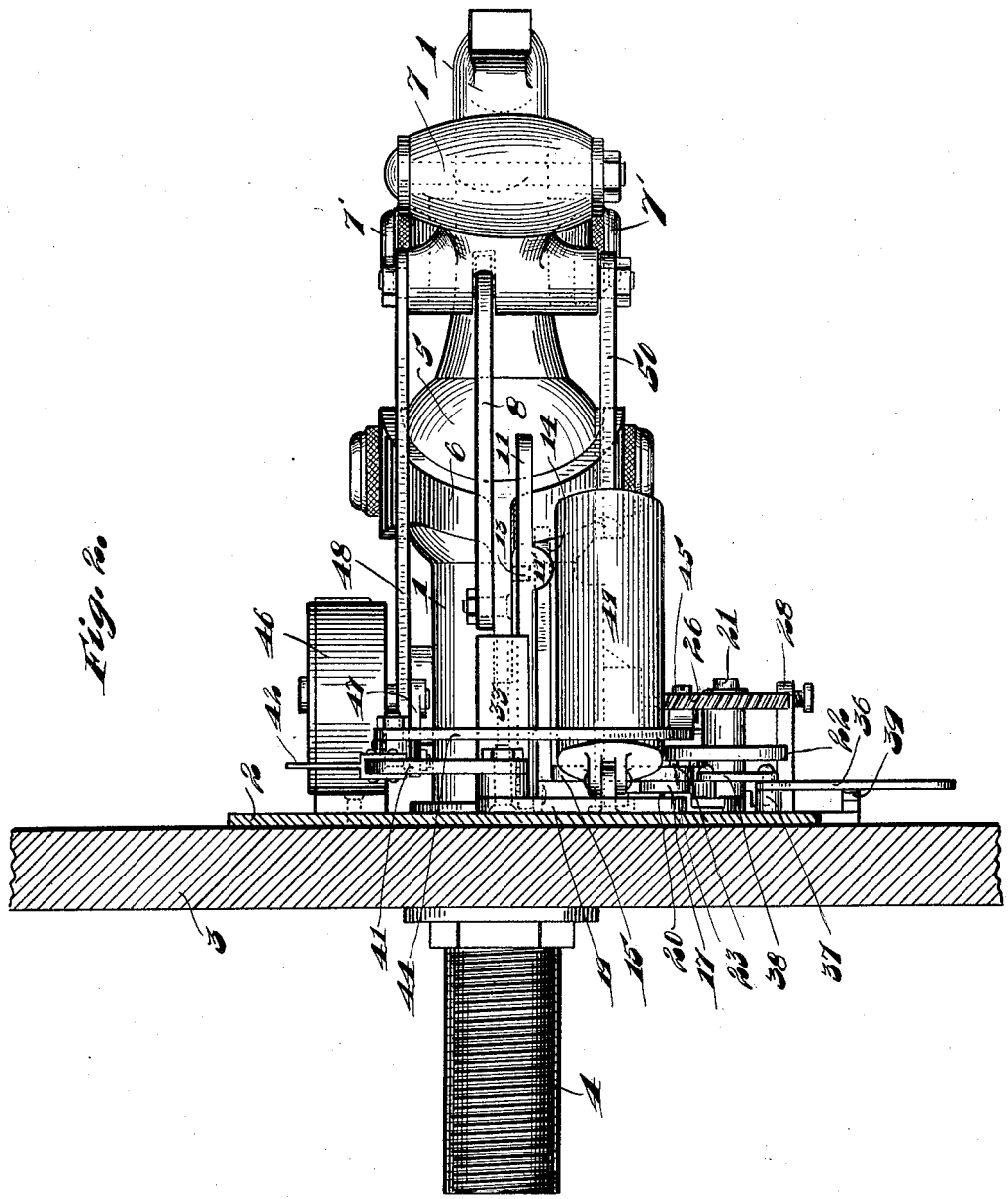

F. SCHORIK & F. F. MARSHALL.
AUTOMATIC LIQUID MEASURING DEVICE.
APPLICATION FILED MAR. 28, 1913.
1,102,806.
Patented July 7, 1914.
5 SHEETS—SHEET 4.
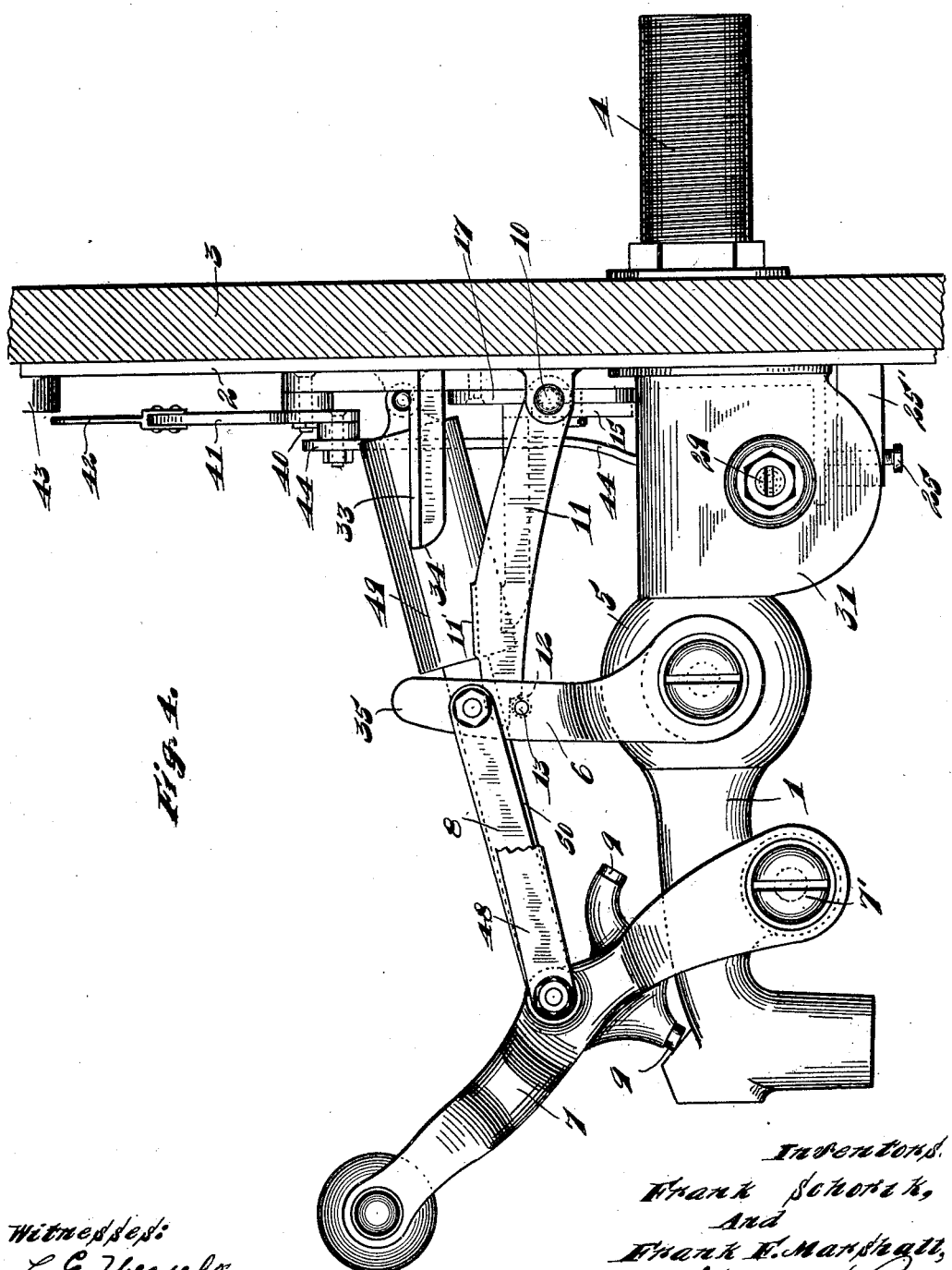

F. SCHORIK & F. F. MARSHALL.
AUTOMATIC LIQUID MEASURING DEVICE.
APPLICATION FILED MAR. 28, 1913.
1,102,806.
Patented July 7, 1914.
5 SHEETS—SHEET 5.
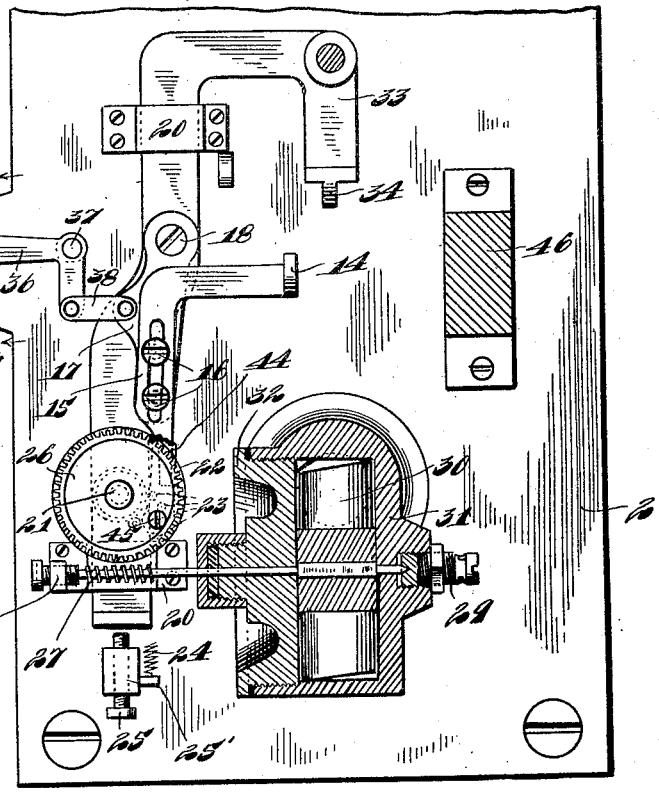
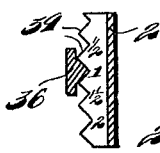
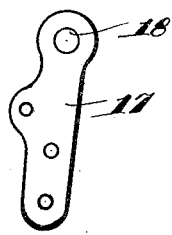
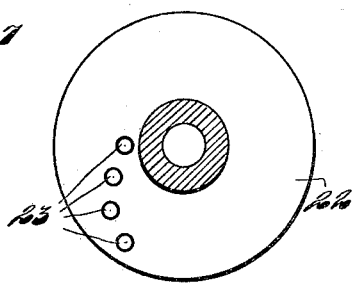
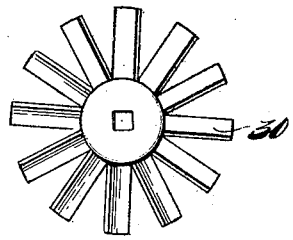

UNITED STATES PATENT OFFICE.

FRANK SCHORIK AND FRANK F. MARSHALL, OF CHICAGO, ILLINOIS.

AUTOMATIC LIQUID-MEASURING DEVICE.

1,102,806.   Specification of Letters Patent.   Patented July 7, 1914.

Application filed March 28, 1913. Serial No. 757,340.

*To all whom it may concern:*

Be it known that we, FRANK SCHORIK and FRANK F. MARSHALL, citizens of the United States, and residents of the city of Chicago, county of Cook, and State of Illinois, have invented certain new and useful Improvements in Automatic Liquid-Measuring Devices, of which the following is a specification.

Our invention relates to improvements in automatic liquid measuring devices, and has for its object the production of a device of this character, which will be adapted for use especially in bar rooms or saloons where beer or other liquid is sold by the quart or pint, the beer or liquid being drawn from faucets arranged at the inner side of the bar or counter. At the present time considerable time is lost by reason of the fact that a bartender or other person superintending the measuring of the beer or liquid is required, after opening the faucet, to remain until the desired quantity has been drawn and then to shut off the faucet by hand. Also, at the present time the bartender or person drawing the beer or liquid is required to exercise his judgment as to the amount of beer or liquid which is drawn by him, there being no definite means of measuring.

It is therefore the object of the present invention, to provide a faucet which may be adjusted to permit of the passage of any desired quantity of liquid therethrough, and which, after being moved to open position, will automatically shut itself off after that quantity of liquid has been drawn.

A still further object is the production of mechanism of the character described which will be of durable and economical construction and efficient in use. Other objects will appear hereinafter.

With these objects in view, our invention consists of the combinations and arrangements of parts hereinafter described and claimed.

The invention will be best understood by reference to the accompanying drawings forming a part of this specification, and in which, Figure 1 is a front elevation of a liquid measuring device embodying our invention, parts thereof being broken away and shown in section, Fig. 2 is a top plan view of the device, Fig. 3 is a section taken on substantially line $x$—$x$ of Fig. 1, the device being arranged with the controlling valve of the faucet closed, Fig. 4 is a view similar to Fig. 3, showing the opposite side of the device, the latter being, however, shown adjusted to open the controlling valve of the faucet, parts of the construction being broken away and omitted in order to expose underlying parts, Fig. 5 is a section taken on line $y$—$y$ of Fig. 3, Fig. 6 is a sectional detail taken on substantially line $z$—$z$ of Fig. 5, Fig. 7 is a detail of one of the levers coöperating with the trigger of the device, Fig. 8 is a sectional view illustrating the rearward side of the disk carrying the pins which effect actuation of the trigger, when said disk is rotated, and Fig. 9 is a detail of the water wheel employed in the construction. Fig. 10 is a detail of the means for raising the trigger.

The preferred form of construction as illustrated in the drawings comprises a faucet 1 which is secured to and which projects through a plate 2 which is adapted for fastening upon the support 3 at any location desired. The rearward end 4 of the faucet 1 projects through the supporting member 3 and the same is threaded for connection with a supply pipe which communicates with any suitable source of liquid supply. The passage through the faucet 1 is controlled by a valve 5 of any approved design, operation of said valve being effected by an upwardly extended pivoted arm 6. The arrangement is such, that, when the arm 6 is in a rearwardly tilted position or at its rearward terminal of oscillation, as shown in Fig. 3 the valve 5 will be closed, and when said arm is in a substantially vertical position or at its forward terminal of oscillation, as shown in Fig. 4, said valve will be open. Fulcrumed at 7′ upon the faucet 1 is a handle 7 which is operatively connected with the operating arm 6 of the valve 5 by means of a link 8, said handle, when the device is in use being adapted for manual engagement in swinging the arm 6 to its forward terminal of oscillation and hence to move the valve 5 to open position. The handle 7 is provided with buffers 9 which coöperate therewith to absorb jars which are incident to oscillation of said handle. Pivoted at 10 to the plate 2 is a forwardly projecting detent 11 provided at its forward or free end with a shoulder 12 adapted to engage with a laterally projecting pin 13 provided at the upper end of the arm 6, to releasably hold said arm at its forward terminal of oscillation and hence the valve 5 in open position. The arrangement is such, that the under side of the detent 11 remains constantly in engagement with said pin, said pin sliding in contact with said edge of said detent upon oscillation of said arm, and so that when said arm is moved to its forward terminal of oscillation the shoulder 12 of said detent will automatically drop into position behind said pin to releasably hold said arm in this position.

Tripping of the detent 11 in order to effect release of the arm 6 is secured through the medium of a trigger 14, the forward end of said trigger being adapted to engage against the under side of a laterally projecting lip 11′ formed at the free end of said detent, and so that, when said trigger is moved upwardly, the same will engage said lip and cause upward swinging of said detent to releasing position. The rearward vertically disposed end 15 of the trigger 14 is secured by screws 16 to a plate 17 which is pivoted at its upper end as at 18 to a member 19 which is mounted for vertical movement upon the plate 2 in guide loops 20 which loosely embrace said member 19 at its upper and lower extremities, as clearly shown in the several views. The screws 16 engage an elongated slot provided in the end 15 of the trigger, such construction permitting of relative vertical movement of the trigger, as will be readily understood.

Mounted upon a stud shaft 21 which is secured to and which projects forwardly from the lower end of the member 19 is a disk 22 upon the rearward side of which are provided projecting pins 23. There are a number of pins 23 which are arranged at varying distances from the center of rotation of said disk and spaced circumferentially thereon, as clearly shown in Fig. 8. The lower extremity of the portion 15 of the trigger 14 is positioned for contact with any one of the pins 23 whereby, upon positive rotation of said disk contact of any one of said pins with said lower end of the portion 15 of the trigger 14 will effect elevation of the latter to cause tripping of the detent 11. Retrograde rotation of the disk 22 is effected by a helical tension spring 24, which also serves to hold the member 19 at its lower terminal of sliding movement or in contact with a stop constituted by a screw 25 which is threaded for adjustment in a lug 25′ formed upon the front side of the plate 2. Positive rotation of the disk 22 in order to move the pins 23 into engagement with the lower end of the portion 15 of the trigger, as above mentioned is effected by means of a worm 27 which is adapted to mesh with a worm wheel 26 which is formed integral with the disk 22 being connected therewith by a reduced hub, as shown. The extremities of the spindle of worm 27 are mounted in suitable bearings 28 and 29, one end of said spindle carrying a water wheel 30 which is mounted in a housing 31 formed at the under side of the faucet 1 just behind the valve 5. The water wheel 30 is so positioned that the passage of liquid through the faucet will cause rotation of said water wheel which in turn will impart simultaneous rotary movement to the worm 27. The wings or blades of the water wheel 30 are preferably inclined transversely, as shown in Fig. 9, it having been found that a wheel so constructed is most effective and uniform in the number of rotations which will be imparted thereto in the flow of liquid through the faucet. One side of the housing 31 is closed by a removable head 32 which permits of access to the interior of said housing for the insertion or removal of the water wheel. At the point of passage of the stem of the worm 27 through said member 32 is provided a suitable packing to prevent leakage. With this arrangement it will be seen that upon the passage of liquid through the faucet, with the worm wheel 26 in mesh with the worm 27, such passage will effect rotation of water wheel 30 and hence worm 27, the latter in turn causing rotation of said worm wheel. Rotation of said worm wheel effects positive rotation of the disk 22 moving the pins 23 toward the lower end of the portion 15 of the trigger 14 to cause tripping of the detent 11 when one of said pins 23 engages with said end of said trigger and causes vertical movement of the latter.

Formed at the upper end of the member 19 is a forwardly projecting arm 33 provided at the under side of the forward end thereof with a curved face 34. Formed at the upper end of the arm 6 is an extension or lug 35 adapted, when the arm 6 is moved to closing position after release of said arm through tripping of the detent 11, to engage the surface 34 of the arm 33 of member 19 to cause slight upward movement of said arm and hence corresponding movement of the member 19. Such movement of the member 19 effects elevation of the worm wheel 26 from engagement with the worm 27 in order to permit of retrograde rotation of the disk 22 by the influence of the spring 24. Thus, with this construction when the valve 5 is in closed position the operative connection between the worm 27 and the worm wheel 26 will be broken, this connection being established only upon forward swinging of the arm 6 to open the valve, in which event the portion 35 is moved from engagement with the arm 33 permitting the member 19 to move downwardly by gravity aided by the spring 24.

Through the provision of a plurality of pins 23 arranged as shown and described, it will be seen that by adjusting the portion 15 of the trigger member so that the lower extremity thereof will contact with a certain one of said pins, the duration of the interval at the expiration of which said trigger will be actuated by the disk 22 in the rotation of the latter may be varied, it being clear that by spacing said pins 23 circumferentially upon said disk, the same will reach their operative positions relative to the lower extremity of the portion 15 of the trigger successively, the pin 23, with the arrangement disclosed, which is closest to the center of the disk being adapted to first reach its operative position relative to said end of said trigger and the pin 23 adjacent the periphery of said disk being the last to reach its operative position upon rotation of the disk 22. In order to adapt said end of said trigger for engagement with the various pins 23 the same is mounted upon the plate 17 which is mounted for pivotal adjustment. Such adjustment of said plate 17 and hence the lower end portion 15 of the trigger is secured through the medium of a manually operable bell crank lever 36 which is pivoted at 37 upon the plate 2. One end of said trigger is connected by a link 38 with the plate 17, the arrangement being such, that upon vertical swinging of the outer handle-forming end of said lever, said plate 17 and hence the end 15 of the trigger carried thereby may be adjusted as desired. A notched graduated flange 39 formed at one edge of the plate 2 coöperates with the lever 36 to releasably hold the same in its positions of adjustment, the graduations indicating the quantity of liquid which will flow through the faucet, before the latter is automatically shut off at the various adjustments of said lever. With this arrangement then, after determining the amount or quantity of liquid which it is desired to draw, the lever 36 is manually adjusted to engage the same with the corresponding notch in the flange 39 whereupon the valve is opened.

Fulcrumed at 40 to the upper end of the member 19 is a bell crank lever 41 to the outer end of one arm of which is secured a hand or indicator 42 in proximity with the outer end of which is provided a graduated scale 43 adapted to coöperate with said indicator, the graduations upon said scale corresponding with the graduations coöperating with the notched flange 39. The outer end of the other arm of the lever 41 is connected by means of an angular link 44 with the worm wheel 26, as shown at 45. With this arrangement, upon rotation of the worm wheel 26, as above mentioned, the indicator 42 will move simultaneously to indicate the quantity of liquid which is discharged at any particular time.

Coöperating with the handle 7 is a helical torsional spring housed in a housing 46 which is secured upon the front side of the plate 2, said spring being connected with a rocker arm 47. Said rocker arm is connected by means of a link 48 with the handle 7, said spring being adapted normally to hold the same in a position with the valve 5 closed and so that, upon release of the arm 6 by the detent 11, as above described, said spring will immediately rock the handle 7 rearwardly and consequently the valve 5 to closing position. A dash pot 49 coöperates with the handle 7 to absorb any jars which will be incident to the rapid return of the handle 7 to closing position under the influence of the returning mechanism just mentioned. The forward end of the piston rod 50 of said dash pot is pivotally connected with the handle 7, as clearly shown in Fig. 3.

With a device then of the construction set forth, when it is desired to operate the same it is first required, after determining the quantity or amount of liquid which it is desired to draw, to adjust the hand operable lever 36 to correspond with such amount, as indicated by the graduations coöperating with the flange 39. After this adjustment the valve handle 7 is rocked forward causing opening of the valve 5. Said valve will be held in open position by the detent 11 which will automatically move into engagement with the laterally projecting pin 13 of the valve arm 6 when said valve is in fully opened position. Immediately upon forward swinging of the arm 6 which movement thereof is effected upon rocking of the handle 7 to open position, the upper end or extension 35 of the arm 6 will move from engagement with the arm 33 provided at the upper end of the member 19 permitting of slight downward movement of the latter. This movement of the latter causes engagement of the worm wheel 26 with the worm 27, and so that upon rotation of said worm wheel such as is imparted thereto through rotation of the water wheel which is operated by the passage of liquid through the faucet, the disk 22 will be caused to positively rotate carrying the pins 23 thereof toward the lower extremity of portion 15 of the trigger 14. When the desired quantity of liquid has flowed through the faucet, one of the pins 23 will contact with the lower end of the portion 15 of the trigger 14 and cause movement of the latter upwardly to effect tripping of the detent 11. Upon tripping of said detent the arm 6 and handle 7 and hence the valve 5 will be moved to closing position under the influence of the closing mechanism 46. Thus with this arrangement in use it will only be required to adjust the mechanism to the amount of liquid which it is desired to draw, and then to open the valve, the closing of the valve after the desired quantity of liquid has flowed through the faucet being automatically effected.

While we have illustrated and described the preferred form of construction for carrying our invention into effect, this is capable of variation and modification without departing from the spirit of the invention. We, therefore, do not wish to be limited to the exact details of construction set forth, but desire to avail ourselves of such variations and modifications as come within the scope of the appended claims.

Having described our invention what we claim as new and desire to secure by Letters Patent is:

1. A liquid measuring device comprising a faucet having a controlling valve therein; means for yieldingly holding said valve normally in closed position; a detent for releasably holding said valve in open position; a trigger for tripping said detent; means for actuating said trigger; a water wheel operable by the liquid passing through said faucet; means operative through rotation of said water wheel for operating said actuating means to actuate said trigger; and means for breaking the operative connection between said water wheel and said actuating means upon tripping of said detent and movement of said valve to closing position, substantially as described.

2. A liquid measuring device comprising a faucet having a controlling valve therein; means for yieldingly holding said valve normally in closed position; a detent for releasably holding said valve in open position; a trigger for tripping said detent; means for actuating said trigger; a water wheel operable by the liquid passing through said faucet; means operative through rotation of said water wheel for operating said actuating means to actuate said trigger; means for breaking the operative connection between said water wheel and said actuating means upon tripping of said detent and movement of said valve to closing position; and means for establishing said operative connection between said water wheel and said actuating means upon movement of said valve to open position, substantially as described.

3. A liquid measuring device comprising a faucet having a controlling valve therein; means for yieldingly holding said valve normally in closed position; a detent for releasably holding said valve in open position; a trigger for tripping said detent; means for actuating said trigger; a water wheel operable by the liquid passing through said faucet; means operative through rotation of said water wheel for operating said actuating means to actuate said trigger; means for breaking the operative connection between said water wheel and said actuating means upon tripping of said detent and movement of said valve to closing position; and resilient means for establishing said operative connection between said water wheel and said actuating means upon movement of said valve to open position, substantially as described.

4. A liquid measuring device comprising a faucet having a controlling valve therein; means for yieldingly holding said valve normally in closed position; a detent for releasably holding said valve in open position; a trigger for tripping said detent; means for actuating said trigger; means for adjusting said trigger to vary the interval at the expiration of which said trigger will be actuated by said actuating means; a water wheel operable by the passage of liquid through said faucet; and means operative through rotation of said water wheel for operating said actuating means to actuate said trigger, substantially as described.

5. A liquid measuring device comprising a faucet having a controlling valve therein; means for yieldingly holding said valve normally in closed position; a detent for releasably holding said valve in open position; a trigger for tripping said detent; means for actuating said trigger, said actuating means comprising a rotatable member; a plurality of contact points on said rotatable member arranged at varying distances from the center of rotation of said member and spaced circumferentially, said points being adapted, upon rotation of said member, to contact with said trigger to effect actuation thereof; means for adjusting said trigger to position the same for engagement by any one of said points of contact; and means operable by the passage of liquid through said faucet for positively operating said rotatable member, substantially as described.

6. A liquid measuring device comprising a faucet having a controlling valve therein; means for yieldingly holding said valve normally in closed position; a detent for releasably holding said valve in open position; a trigger for tripping said detent; means for actuating said trigger, said actuating means comprising a rotatable member; a plurality of contact points on said rotatable member arranged at varying distances from the center of rotation of said member and spaced circumferentially, said points being adapted, upon rotation of said member, to contact with said trigger to effect actuation thereof; means for adjusting said trigger to position the same for engagement by any one of said points of contact; means operable by the passage of liquid through said faucet for positively operating said rotatable member; and means for breaking said operative connection between said last mentioned means and said rotatable member upon tripping of said detent and movement of said valve to closing position to permit of retrograde movement of said rotatable member, substantially as described.

7. A liquid measuring device comprising a faucet having a controlling valve therein; means for yieldingly holding said valve normally in closed position; a detent for releasably holding said valve in open position; a trigger for tripping said detent; rotatable means adapted, when rotated in one direction, to actuate said trigger; means for adjusting said trigger to vary the interval at the expiration of which said trigger will be actuated by said actuating means; a water wheel operable by the passage of liquid through said faucet; means operative through rotation of said water wheel for operating said actuating means to actuate said trigger; the connection comprising a worm and a worm wheel; and means for moving said worm wheel from engagement with said worm upon tripping of said detent and movement of said valve to closing position to permit of retrograde movement of said actuating means, substantially as described.

8. A liquid measuring device comprising a faucet having a controlling valve therein; means for yieldingly holding said valve normally in closed position; a detent for releasably holding said valve in open position; a trigger for tripping said detent; rotatable means adapted, when rotated in one direction, to actuate said trigger; means for adjusting said trigger to vary the interval at the expiration of which said trigger will be actuated by said actuating means; rotatable means operable by the passage of liquid through said faucet; means operative through rotation of said rotatable means for operating said actuating means to actuate said trigger, said last mentioned means comprising a worm and a worm wheel; and means for moving said worm wheel from engagement with said worm upon tripping of said detent and movement of said valve to closing position to permit of retrograde movement of said actuating means, substantially as described.

9. A liquid measuring device comprising a faucet having a controlling valve therein; an oscillatory arm for operating said valve; means for yieldingly holding said valve normally in closed position; a detent engaging with said arm for releasably holding said valve in open position; a trigger for tripping said detent; means for actuating said trigger; means operable by the passage of liquid through said faucet; and means operative through rotation of said last mentioned means for operating said actuating means to actuate said trigger, said arm, when said valve is moved to closing position, being adapted to break the operative connection between said actuating means and said last mentioned means, substantially as described.

10. A liquid measuring device comprising a faucet having a controlling valve therein; an oscillatory arm for operating said valve; means for yieldingly holding said valve normally in closed position; a detent adapted to engage with said arm for yieldingly holding said valve in open position; a trigger for tripping said detent; a vertically slidable member; a rotatable member carried by said slidable member adapted, when rotated in one direction, to actuate said trigger; and means operable by the passage of liquid through said faucet for operating said rotatable member, vertical movement of said slidable member moving said rotatable member from operative relation with said operating means, said arm, when said valve is moved to closing position, being adapted to move said slidable member to disengage said rotatable member from said operating means, substantially as described.

11. A liquid measuring device comprising a faucet having a controlling valve therein; an oscillatory arm for operating said valve; means for yieldingly holding said valve normally in closed position; a detent adapted to engage with said arm for yieldingly holding said valve in open position; a trigger for tripping said detent; a vertically slidable member; a rotatable member carried by said slidable member adapted, when rotated in one direction, to actuate said trigger, tilting movement of said trigger varying the interval at the expiration of which said trigger will be actuated by said rotatable member; means for adjusting and releasably holding said trigger in positions of tilting adjustment; and means operable by the passage of liquid through said faucet for operating said rotatable member, vertical movement of said slidable member moving said rotatable member from operative relation with said operating means, said arm, when said valve is moved to closing position being adapted to move said slidable member to disengage said rotatable member from said operating means to permit of retrograde movement of said rotatable member, substantially as described.

12. A liquid measuring device comprising a faucet having a controlling valve therein; an oscillatory arm for operating said valve; means for yieldingly holding said valve normally in closed position; a detent adapted to engage with said arm for yieldingly holding said valve in open position; a trigger for tripping said detent; a vertically slidable member; a rotatable member carried by said slidable member adapted, when rotated in one direction, to actuate said trigger, tilting movement of said trigger varying the interval at the expiration of which said trigger will be actuated by said rotatable member; a pivoted adjusting lever for tilting said trigger; graduated means coöperating with said lever for releasably holding said lever in positions of adjustment; and means operable by the passage of liquid through said faucet for operating said rotatable member, vertical movement of said slidable member moving said rotatable member from operative relation with said operating means, said arm, when said valve has moved to closing position, being adapted to move said slidable member to disengage said rotatable member from said operating means to permit of retrograde rotation of said rotatable member, substantially as described.

13. A liquid measuring device comprising a faucet having a controlling valve therein; means for yieldingly holding said valve normally in closed position; a detent for releasably holding said valve in open position; a trigger for tripping said detent; means for actuating said trigger; means for adjusting said trigger to vary the interval at the expiration of which said trigger will be actuated by said actuating means; a water wheel operable by the passage of liquid through said faucet; means operative through rotation of said water wheel for operating said actuating means to actuate said trigger; a pivoted indicator and graduations coöperating therewith; and an operative connection between said indicator and said actuating means, substantially as described.

In testimony whereof we have signed our names to this specification in the presence of two subscribing witnesses.

FRANK SCHORIK.
    FRANK F. MARSHALL.

Witnesses:
 ARTHUR A. OLSON,
 JOSHUA R. H. POTTS.

---

Copies of this patent may be obtained for five cents each, by addressing the "Commissioner of Patents, Washington, D. C."